United States Patent Office — 2,933,486 — Patented Apr. 19, 1960

2,933,486
STORAGE OF ROSIN IN MOLTEN FORM

Edward Strazdins, Stamford, Conn., assignor to American Cyanamid Company, New York, N.Y., a corporation of Maine No Drawing. Application July 30, 1956
Serial No. 600,723

4 Claims. (Cl. 260—97.5)

The present invention relates to the prevention of crystallization of rosin maintained in bulk molten form over extended periods of time.

Rosin exists in a number of forms. Gum rosin is the residue obtained by steam distillation of pine oleoresin. Wood rosin is obtained by the solvent extraction of pine wood stumps. Tall oil rosin is a new type of rosin for which standards have been determined by the U.S. Department of Agriculture, and is produced by fractional distillation of tall oil (obtained from pine wood). Recently, the effectiveness of these types of rosin as raw materials for the manufacture of rosin size for paper has been improved by reaction of the rosin with a small amount (e.g. $1/12$–$1/5$ mol) of an alpha,beta-unsaturated di-or polybasic carboxylic acid or anhydride (represented by fumaric acid, maleic anhydride, and the unsaturated acids resulting from dehydration of citric acid), the product being generally termed "fortified" rosin. Moreover, fortified rosin may contain a few percent of a lower esterified alkanol as melting point depressant.

The production of the foregoing rosins is an intricate chemical engineering operation for which a large processing plant and trained personnel are necessary. Pine oleoresin, pine wood and pine stumps (obtained locally) are the sources of the rosins, and the rosins are generally shipped in bulk molten form to consumers or processors located nearer metropolitan or industrial centers for conversion into ester gum, limed rosin, rosin size, laundry soap, etc. The flow point of rosin is quite low (less than 100° C.) and it has therefore been found practical to ship the material in molten form in thermally insulated railroad tank cars. Wherever possible, the rosin is introduced into the cars at such temperature that it is a liquid on arrival.

It is an undesirable fact that all of the foregoing rosins tend to crystallize when stored in molten form. Wood and tall oil rosins not infrequently crystallize in a matter of hours. Gum rosin appears to be more stable, perhaps as a result of the presence of natural gums which interfere with crystal formation, but crystallization of gum rosin within as short a period as 24 hours has occurred on a number of occasions. The crystallization is characterized by transformation of the clear amber fluid rosin into a substantially solid opaque mass of interlaced crystals having a melting point of about 140°–150° C. Rosin which has crystallized in bulk (in a railroad tank car, for example) can be removed only by reconversion to molten form using super-heated steam. This melting operation is tedious and costly.

It is known that crystallization of rosin can be inhibited or prevented by subjecting the rosin to a heat treatment (cf. U.S. Patent Nos. 2,576,094 and 2,717,838) and this the sole practical commercial method now generally known. These treatments, however, darken the rosin and decrease its effectiveness as a paper sizing raw material.

The present invention is based upon the discovery that crystallization of molten rosin can be inhibited by irreversibly reacting the rosin with a small amount of formaldehyde. The reaction proceeds at moderate temperature faster than the tendency of rosin to crystallize and does not appear to be detrimental to any of the principal beneficial characteristics of the rosin.

The amount of formaldehyde needed to prevent crystallization and thus confer total protection for normal periods of storage is astonishingly small, and so far no more than 5% of formaldehyde has been required for this purpose based on the weight of the rosin. This amount is sufficient even in the case of tall oil rosin, which is the type of rosin most prone to crystallize, and in numerous instances less has proved satisfactory. About 1% of formaldehyde is sufficient in the case of gum rosin. Although it has long been known that formaldehyde is capable of reacting with rosin (cf. U.S. Patent No. 1,243,312), it has not heretofore been known that the reaction of rosin with a minor amount of formaldehyde has the capacity of preventing the rosin from crystallizing. The invention includes the reaction of small amounts of formaldehyde to inhibit crystallization for predetermined short periods of time and, also, includes the reaction of larger amounts of formaldehyde up to about one mol, so as to provide a master batch of treated rosin which can be blended with untreated rosin to form a composition containing a minimum effective amount of combined formaldehyde.

From the foregoing, it will be seen that the present invention is broadly directed towards preventing or retarding the crystallization of rosin in bulk molten form for a length of time during which the rosin would otherwise crystallize, the crystallization being prevented or retarded by irreversibly prereacting the rosin with a small but effective amount of formaldehyde.

The amount of formaldehyde advantageously reacted with the rosin in any one instance is dependent chiefly upon the length of time it is desired to inhibit crystallization, the temperature at which the rosin is stored, and the type of rosin. The amount of formaldehyde needed increases with the required duration of the inhibitory effect, and less is required when the storage temperature is maintained above or below 110° C. Gum rosin requires least formaldehyde, tall-oil rosin requires most formaldehyde, and fortified rosins usually require less than the unmodified rosins from which they are prepared. The optimum amount of formaldehyde needed in any one instance is readily found by laboratory trial.

As little as $1/20$ mol of formaldehyde per mol of rosin noticeably inhibits the crystallization even of unmodified (i.e., freshly distilled, untreated) tall oil rosin and, thus, evidently there is no amount of formaldehyde, however small, which will not produce some beneficial result. At the other extreme between $1/2$ and $2/3$ mol of formaldehyde is usually sufficient to prevent crystallization for about 10 days, which is sufficient to meet most commercial requirements.

In practice with wood and tall oil rosin, both modified and unmodified, we prefer to add between 2.5% and 5.0% ($1/4$ and $1/2$ mol) of formaldehyde per mol of rosin as within this range very satisfactory inhibition of crystallization is effected and over-use of formaldehyde avoided.

A source of formaldehyde, there may be used aqueous formalin, formaldehyde gas, or trioxymethylene, the rosin being maintained at reaction temperature under suitable pressure until reaction of the formaldehyde is substantially complete. In practice we find it more convenient to employ commercial paraformaldehyde either as such or in solution in an alcohol solvent such as the composition sold under the trade name "Formcel."

The formaldehyde may be reacted with the rosin at any convenient temperature so as to effect irreversible reaction thereof. Generally, the irreversible reaction begins at about 135–150° C., the rosin forming only a loose association complex with the formaldehyde at materially lower temperatures. Temperatures in excess of about 250° C. are not preferred, as these cause darkening of the rosin and decrease its effectiveness as a raw material for the manufacture of paper size. Best results have been obtained in the range of 190° C.–230° C., this range providing a fast and complete reaction of the formaldehyde while minimizing deterioration of the rosin. The presence of free formaldehyde can be detected by the known phenylhydrazine method of analysis.

From the foregoing, it will be seen that the invention chiefly resides in the discovery that crystallization of molten rosin can be inhibited by prereacting the rosin with formaldehyde. The specific amount of formaldehyde reacted, the types of rosin and formaldehyde employed, and the specific temperature and duration of the reaction are thus not primary features.

The reaction may be performed in any heat-resistant vessel, and it is a feature of the invention that a thermally insulated railroad tank car or highway truck may be used for the purpose. In the latter event, the rosin is admitted to the tank car or truck at such temperature that substantially all of the formaldehyde reacts to effect its anti-crystallizing action before the rosin crystallizes. The minimum temperature is about 140° C. and the optimum temperature will vary with the type of rosin, effectiveness of thermal insulation and ambient temperature. In the case of tall oil, rosin temperature of 190° C. appears preferable.

The treated rosins produced according to the present invention may be used for the principal purposes for which rosin has been used in the past. The rosins are particularly suited for conversion into paper size and may be applied in substantially the same way as rosin which has not been so treated while generally yielding superior results in terms of sizing efficiency imparted.

The invention will be more practically illustrated by the examples which follow. These examples illustrate specific embodiments and are not to be construed as limitations thereon.

*Example 1*

The following illustrates the inhibition and prevention of crystallization of principal commercial rosins according to the present invention, particularly with respect to the effect of the amount of formaldehyde added.

It is known that crystallization of rosin is principally a function of the temperature at which it is stored, the rosin being most prone to crystallize at about 110° C. It is further known that crystallization may be accelerated by adding a small amount of powdered crystallized rosin to provide crystal nuclei. The following tests were therefore performed by incubating 50 gm. samples of the designated rosins in a thermostatically-controlled oven at 110° C., a pinch of finely ground crystallized rosin of the same respective type being first uniformly stirred into each sample as seeding agent.

Three grades of tall oil rosin were employed: S grade (softening point 75° C. obtained by fractional distillation of tall oil); D grade (softening point 83° C. a similar rosin containing slightly more unsaponifiables), and fortified S grade rosin. The fortified rosin was made by reacting the S grade rosin with 5% of its weight of maleic anhydride at 175° C.

Crystallization is evidenced by development of first a haze and then opacity in the originally clear amber liquid rosin. The extent of crystallization is reported in terms of a scale wherein 0 represents no crystallization; 1 represents development of a slight haze; 2 represents development of opacity while the rosin remains of pumpable viscosity, and 3 represents substantially complete crystallization with increase of viscosity beyond the pumpable range or solidification. Tall oil rosin rated as 1 on the above scale is substantially as useful for all purposes as rosin rated 0, but is in the stage of incipient total crystallization. Tall oil rosin rated as 2 is generally rejected by manufacturers of paper size but is generally accepted by synthetic resin manufacturers. Tall oil rosin rated as 3 has no substantial use until remelted.

Experience has shown that tall oil rosins which fail to develop any crystallization in 96 hours in the above test are generally permanently non-crystallizing.

| Run No. | Rosin | CH$_2$O Added | | React. Temp., ° C. | Crystallization [3] | | | | |
|---|---|---|---|---|---|---|---|---|---|
| | | Mols [1] | Percent [2] | | 1 Hr. | 4 Hr. | 24 Hr. | 48 Hr. | 96 Hr. |
| 1 | Gum, M Grade | | | 200 | 0 | 1 | 2 | 3 | 3 |
| 2 | do | 0.1 | 1.0 | 200 | 0 | 0 | 0 | 0 | 0 |
| 3 | Wood, N Grade | | | 200 | 0 | 3 | 3 | | |
| 4 | do | 0.33 | 3.0 | 200 | 0 | 0 | 0 | | |
| 4 | Tall oil, S Grade | | | 200 | 2 | 3 | | | |
| 6 | do | 0.1 | 1.0 | 200 | 1 | 2 | 3 | | |
| 7 | do | 0.2 | 2.0 | 200 | 1 | 1-2 | 2-3 | 3 | |
| 8 | do | 0.25 | 2.5 | 200 | 0 | 1 | 2 | 2-3 | 3 |
| 9 | do | 0.33 | 3.3 | 200 | 0 | 0 | 0 | 0 | 0 |
| 10 | Tall oil, D grade | | | 200 | 3 | | | | |
| 11 | do | 0.5 | 5.0 | 200 | 0 | 0 | 0 | 0 | 0 |
| 12 | Tall Oil, fortified S grade | | | 200 | 1 | 2-3 | 3 | | 2 |
| 13 | do | 0.1 | 1.0 | 200 | 0 | 1 | 2 | 2 | 2 |
| 14 | do | 0.15 | 1.5 | 200 | 0 | 0 | 1 | 1 | 1 |
| 15 | do | 0.2 | 2.0 | 200 | 0 | 0 | 0 | 0 | 0 |

[1] Per mol of rosin (molecular weight 302).
[2] Based on weight of rosin.
[3] For ratings, see text above.

The table shows that a very small amount of formaldehyde inhibits the rate at which the foregoing rosins crystallize, that D grade tall oil rosin is the rosin which crystallized most rapidly, this rosin crystallizing completely in one hour (run 10), and that reaction of only 5% of formaldehye therewith entirely prevented formation of crystals in this rosin for 96 hours.

*Example 2*

The following illustrates one method for employing the present invention in the transportation of liquid tall oil rosin by railroad tank car.

Into a thermally insulated clean aluminum railroad tank car having a nominal capacity of 10,000 gallons (81,000 lb.) was charged 3100 lb. of lump paraformaldehyde after which 70,000 lb. of molten S grade tall oil rosin was run in at a temperature of 190° C. The weight of the paraformaldehyde was 4.0% of the weight of the rosin, equivalent to $\frac{2}{3}$ mol.

The car was transported by rail for 3 days, at which time the contents were still liquid.

A sample of rosin was withdrawn from the car and found to be clear and free from crystals. Less than 0.003% of free formaldehyde was found therein by analysis (phenylhydrazine method) showing that substantially all the formaldehyde had reacted.

The contents of the car were pumped to a heated storage tank where the rosin remained for 5 days. No crystals formed in the rosin during that time.

A sample of the rosin drawn from the tank car was converted to liquid size by saponification with 12% aqueous sodium hydroxide at the boil and tested as a beater sizing agent on bleached Kraft pulp in comparison with a fresh sample of untreated S-grade tall oil rosin. In the test, 2.5% of the size and 3% of alum were added based on the dry weight of the fibers and the handsheets were dried at 240° C. for three minutes. The paper sized with the treated rosin was substantially superior in resistance to penetration by water and by ink, and was very greatly superior in resistance to penetration by dilute (20%) aqueous lactic acid solution.

Example 3

The following illustrates formalin as the source of formaldehyde.

To 150 gm. (½ mol) of crushed S grade tall oil rosin in a steel laboratory bomb was added 16.2 gm. (⅕ mol) of 37% aqueous formalin. The bomb was sealed, heated to 200° C., maintained at that temperature for 1 hour, and cooled. The pressure was vented and analysis by the phenylhydrazine test showed less than 0.004% free formaldehyde.

A sample of the rosin was tested by the method of Example 1 to determine its tendency to crystallize. It was completely free from crystals at 96 hours and thus was rated "0."

I claim:

1. In the storage of rosin in molten form wherein said rosin is maintained at a temperature and for a length of time during which said rosin would otherwise crystallize, the method of preventing said crystallization which comprises irreversibly reacting said rosin with a small but effective amount of formaldehyde thereby forming a mixture of rosin and rosin-aldehyde adduct.

2. A method according to claim 1 wherein the formaldehyde is paraformaldehyde and is reacted with the rosin at atmospheric pressure.

3. A method according to claim 1 wherein the reaction is performed at a temperature between 190° C. and 230° C.

4. In the storage of tall oil rosin in molten form at temperatures between about 100° C. and 140° C. for a length of time during which said rosin would otherwise crystallize, the method of preventing said crystallization which comprises heating said rosin at a temperature between about 135° C. and 250° C. with between ¼ and ⅔ mol of formaldehyde per mol of said rosin until said formaldehyde has substantially completely reacted therewith thereby forming a mixture of rosin and rosin-aldehyde adduct.

References Cited in the file of this patent
UNITED STATES PATENTS

| | | |
|---|---|---|
| 2,572,071 | St. Clair et al. | Oct. 23, 1951 |
| 2,659,718 | Eckhardt et al. | Nov. 17, 1953 |
| 2,717,838 | Barthel | Sept. 13, 1955 |